US00RE38373E

(19) United States
(12) Reissued Patent
Bosley

(10) Patent Number: US RE38,373 E
(45) Date of Reissued Patent: Dec. 30, 2003

(54) COMPLIANT FOIL FLUID FILM THRUST BEARING WITH A TILTING PAD UNDERSPRING

(75) Inventor: Robert W. Bosley, Cerritos, CA (US)

(73) Assignee: Capstone Turbine Corporation, Chatsworth, CA (US)

(21) Appl. No.: 09/900,775

(22) Filed: Jul. 6, 2001

Related U.S. Patent Documents

Reissue of:
(64) Patent No.: 5,918,985
Issued: Jul. 6, 1999
Appl. No.: 08/933,695
Filed: Sep. 19, 1997

(51) Int. Cl.[7] ..... F16C 32/06
(52) U.S. Cl. ..... 384/106; 384/105
(58) Field of Search ..... 384/103, 105, 384/106, 122, 124

(56) References Cited

U.S. PATENT DOCUMENTS

| | | | |
|---|---|---|---|
| 2,748,714 A | 6/1956 | Henry | |
| 3,375,046 A | 3/1968 | Marley | |
| 3,376,083 A | 4/1968 | Muijderman | |
| 3,382,014 A | 5/1968 | Marley | |
| 3,487,786 A | 1/1970 | Danner | |
| 3,495,886 A | 2/1970 | Roberts | |
| 3,615,121 A | 10/1971 | Barnett | |
| 3,635,534 A | 1/1972 | Barnett | |
| 3,747,997 A | 7/1973 | Winn | |
| 3,795,427 A | 3/1974 | Licht | |
| 3,809,443 A | 5/1974 | Cherubim | |
| 3,870,382 A | 3/1975 | Reinboudt | |
| 4,082,375 A | 4/1978 | Fortmann | |
| 4,116,503 A | 9/1978 | Licht | |
| 4,170,389 A | 10/1979 | Eshel | |
| 4,171,928 A | 10/1979 | Emerson | |
| 4,178,046 A | 12/1979 | Silver | |
| 4,208,076 A | 6/1980 | Gray | |
| 4,213,657 A | 7/1980 | Gray | |
| 4,223,958 A | 9/1980 | Gray | |
| 4,225,196 A | 9/1980 | Gray | |
| 4,227,753 A | 10/1980 | Wilcock | |
| 4,247,155 A | 1/1981 | Fortmann | |
| 4,277,111 A | 7/1981 | Gray | |
| 4,277,112 A | 7/1981 | Heshmat | |
| 4,300,806 A | 11/1981 | Heshmat | |
| 4,309,144 A | 1/1982 | Eggmann | 415/105 |
| 4,315,359 A | 2/1982 | Gray | 29/149.5 |
| 4,315,660 A | 2/1982 | Glienicke | |
| 4,362,343 A | 12/1982 | Visser | |
| 4,371,216 A | 2/1983 | Suzuki | 384/118 |

(List continued on next page.)

OTHER PUBLICATIONS

"Foil Air/Gas Bearing Technology—An Overview," Giri Agrawal, *The American Society of Mechanical Engineers*, Jun. 1997, pp. 1–11.

"Foil Gas Bearings for Turbomachinery," Giri Agrawal, *The Engineering Society for Advancing Mobility Land Sear Air and Space, SAE Technical Paper Series*, Jul. 1990.

*Primary Examiner*—Thomas R. Hannon
(74) *Attorney, Agent, or Firm*—Sterne, Kessler, Goldstein & Fox

(57) ABSTRACT

A compliant foil fluid film thrust bearing including a thrust disk rotor, fluid foils, spring foils, a thrust plate, and a housing thrust surface The non-rotating but compliant fluid foils, mounted on the thrust plate and/or housing thrust surface and positioned adjacent to the thrust disk, have open faced channels that induce regenerative vortex flow patterns in the process fluid. The multiple spring foils together provide a tilting pad support for the fluid foils but allow them to follow the axial and overturning motion of the thrust disk. The interaction of the tilting pad underspring supports and the circumferential fluid pressure gradients in the process fluid between the fluid foils and the thrust disk rotor assure that the fluid foils will assume hydrodynamically efficient convex shapes on the surfaces adjacent to the rotor regardless of the load applied to the thrust bearing.

46 Claims, 9 Drawing Sheets

U.S. PATENT DOCUMENTS

| | | | | |
|---|---|---|---|---|
| 4,383,771 | A | 5/1983 | Freytag | 384/121 |
| 4,462,700 | A | 7/1984 | Agrawal | 384/105 |
| 4,597,677 | A | 7/1986 | Hagiwara | 384/105 |
| 4,621,930 | A | 11/1986 | Gu et al. | 384/105 |
| 4,624,583 | A | 11/1986 | Saville | 384/99 |
| 4,668,106 | A | 5/1987 | Gu | 384/105 |
| 4,682,900 | A | 7/1987 | Gu | 384/105 |
| 4,706,144 | A | 11/1987 | Asada | 360/107 |
| 4,767,221 | A | 8/1988 | Paletta | 384/105 |
| 4,776,077 | A | 10/1988 | Gu | 29/173 |
| 4,871,267 | A | 10/1989 | Gu | 384/105 |
| 4,961,122 | A | 10/1990 | Sakai | 360/107 |
| 5,052,822 | A | 10/1991 | Van Beek | 384/123 |
| 5,102,295 | A | 4/1992 | Pope | 415/104 |
| 5,110,220 | A | 5/1992 | Gu | 384/105 |
| 5,209,579 | A * | 5/1993 | Matake | 384/105 X |
| 5,209,652 | A | 5/1993 | Fischer | 417/409 |
| 5,248,205 | A | 9/1993 | Gu | 384/106 |
| 5,318,366 | A | 6/1994 | Nadjafi | 384/106 |
| 5,358,378 | A | 10/1994 | Holscher | 415/170.1 |
| 5,498,082 | A | 3/1996 | Nadjafi | 384/105 |
| 5,529,398 | A | 6/1996 | Bosley | 384/105 |
| 5,540,505 | A | 7/1996 | Struziak | 384/105 |
| 5,547,286 | A | 8/1996 | Struziak | 384/105 |
| 5,833,369 | A | 11/1998 | Heshmat | 384/105 |
| 5,871,284 | A | 2/1999 | Nadjafi | 384/105 |
| 5,961,217 | A | 10/1999 | Heshmat | 384/105 |
| 5,988,885 | A | 11/1999 | Heshmat | 384/106 |
| 6,224,263 | B1 | 5/2001 | Saville et al. | |

* cited by examiner

COMPLIANT FOIL FLUID FILM THRUST BEARING WITH A TILTING PAD UNDERSPRING

Matter enclosed in heavy brackets [ ] appears in the original patent but forms no part of this reissue specification; matter printed in italics indicates the additions made by reissue.

TECHNICAL FIELD

This invention relates to the general field of compliant foil fluid film bearings and more particularly to an improved thrust bearing employing fluid foils and multiple spring foils to support, position, damp and accommodate movements or excursions of the rotating portion of the bearing.

BACKGROUND OF THE INVENTION

Compliant foil fluid film thrust bearings are currently being utilized in a variety of high speed rotor applications. These bearings are generally comprised of a two sided thrust disk rotating element, non-rotating compliant fluid foil members that axially enclose the rotating element, non-rotating compliant spring foil members that axially enclose the fluid foil members and a non-rotating thrust plate element and a non-rotating housing element that axially enclose and provide attachments for the foil members. The space between the rotating element and the thrust plate element on one side of the bearing and the space between the rotating element and the thrust surface of the housing element on the other side of the bearing are filled with fluid (usually air) which envelops the foils.

The rotary motion of the rotating element applies viscous drag forces to the fluid and induces circumferential flow of the fluid between the smooth surface of the rotating element and the fluid foil. The space between the rotating element and the fluid foil is subdivided into a plurality of fluid-dynamic wedge channels. These wedge channels have typically been formed by resistance welding compliant, convex curved foil pads to an underlying support foil. The leading ramps of the foil pads relative to the fluid's circumferential flow and the smooth surface of the rotating element form the two primary surfaces of the converging wedge channels. The trailing ramps and the smooth surface of the rotating element form the primary surfaces of the diverging wedge channels. The fluid flowing circumferentially along a converging wedge channel experiences steadily decreasing flow area, increasing circumferential flow velocity and increasing static fluid pressure. If the rotating element moves toward the non-rotating element, the convergence angle of the wedge channel increases causing the fluid pressure rise along the channel to increase. If the rotating element moves away, the pressure rise along the wedge channel decreases. Thus, the fluid in the wedge channels exerts restoring forces on the rotating element that vary with and stabilize running clearances and prevent contact between the rotating and non-rotating elements of the bearing. Flexing and sliding of the foils causes coulomb damping of any axial or overturning motion of the rotating element of the bearing.

Owing to preload spring forces or gravity forces, the rotating element of the bearing is typically in physical contact with the fluid foil members of the bearing at low rotational speeds. This physical contact results in bearing wear. It is only when the rotor speed is above what is termed the lift-off/touch-down speed that the fluid dynamic forces generated in the wedge channels assure a running gap between the rotating and non-rotating elements.

Conventional, compliant foil fluid film thrust bearings have fluid dynamic wedge channel ramps that converge or diverge circumferentially with no radial component to the ramp slopes. The converging wedge channel ramps have no side wall or other constraints to prevent fluid flow out of the channels at their inner and outer edges. At the trailing edge of the converging wedge channel, the high fluid pressure and lack of radial flow constraints induces radial flow leakage out of the channel, which in turn, results in a reduction in fluid pressure, a loss in bearing load capacity, and an increase in bearing drag. The radial flow leakage requires make-up flow at the beginning of the converging wedge channel.

Conventional, compliant foil fluid film thrust bearings have primary fluid flow patterns in the converging wedge channels that are single path recirculating loops. The fluid in the converging wedge channels adjacent to the rotating disk travels circumferentially in the same direction as the disk's motion (up the ramp) owing to viscous drag. The fluid in the converging wedge channels adjacent to the non-rotating fluid foil travels-circumferentially in the direction opposite to the disk's motion (down the ramp) owing to the circumferential pressure gradient along the channel. Much of the fluid that travels up the ramp near the disk while gaining static pressure turns back before reaching the end of the wedge channel and travels down the ramp near the fluid foil while losing pressure. Almost all of this fluid turns again before reaching the beginning of the wedge channels and travels up the ramp while again gaining pressure. The fluid traveling the single path recirculating loop flow patterns travels essentially the same path each loop and experiences the same pressure increases and pressure decreases each loop with no net pressure gain from one loop to the next. These bearings generate less fluid dynamic pressure and have less load capacity than bearings that utilize multi-path vortex flow patterns where the flow traveling each regenerative loop travels a different path and where there is a net increase in fluid pressure each loop Conventional, compliant foil fluid film thrust bearings operate with extremely small running clearances and moderate as opposed to low drag and power consumption. The clearances between the non-rotating fluid foil's converging channel ramp trailing ends and the rotating thrust disk are typically less than 100 micro-inches when the bearing is heavily loaded at operating conditions. The bearing's drag coefficient is typically more than 0.005 at operating speed as defined by the ratio of the fluid dynamic drag induced shear forces applied to the disk by the bearing divided by the thrust load carried by the bearing.

Compliant foil fluid film thrust bearings tend to rely on backing springs to preload the fluid foils against the relatively moveable rotating element (thrust disk) so as to control foil position/nesting and to establish foil dynamic stability. The bearing starting torque (which should ideally be zero) is directly proportional to these preload forces. These preload forces also significantly increase the disk speed at which the hydrodynamic effects in the wedge channels are strong enough to lift the rotating element of the bearing out of physical contact with the non-rotating members of the bearing. These preload forces and the high lift-off/touch-down speeds result in significant bearing wear each time the disk is started or stopped.

Many conventional, compliant foil fluid film thrust bearings have large sway spaces and loose compliance, i.e. they do not tightly restrict the axial or overturning motion of the bearing thrust disk, owing to poor control of spring deflection tolerances inherent in the spring designs.

It has been common for compliant foil fluid film thrust bearings to utilize a plurality of coated, convex curved, compliant fluid foil pads that are welded to a support foil to form the fluid foil member of the bearing. These two piece fluid foil members are typically thicker and have poorer thickness control than can single piece fluid foil members. Two piece fluid foil members also experience process fluid foil turbulence, increased drag at operating speeds and reduced load capacity owing to the flow discontinuities between the trailing edges of each foil pad and the weld attachment edge of the next circumferentially located pad.

Some conventional, compliant foil fluid film thrust bearings utilize spring foil elements that are formed by milling (chemically or otherwise) circumferentially offset recesses in opposing sides of flat foil stock so as to leave circumferentially offset unmilled ridges on opposing sides of the foil elements. Pressure applied to the offset ridges induces the spring foil element to deflect in a spring-like manner. Spring foil elements formed in this manner are prone to large variations in their spring rates due to small variations in milling depth. This milling process non-symetrically relieves any residual surface compressive stresses induced by previous foil rolling operations and thus induces foil warpage.

Other bearings utilize convolute shaped spring foil elements that are formed by pressing annealed Inconel 750X foil blanks between two contoured plates having matching wavy contours with constant plate to plate spacing and then heat treating the foil blanks at approximately 1300 degrees Fahrenheit for approximately 20 hours while they are still pressed between the contoured plates. Spring foils formed in this manner are prone to have large variations in undeflected thickness.

In some cases, the fluid foils may be attached to the spring foils by welding or brazing or various spring foil elements may be welded or brazed together to form a spring foil member. Those thrust bearings that utilize welding or brazing to attach one foil element to another are subject to foil distortions and foil fatigue failures, particularly at the bond sites.

The sides of the fluid foils that face the rotating element of the bearing can utilize low rubbing friction coatings to minimize bearing wear when disk speed is below the lift-off/touch-down speed. These coatings, however, may have large thickness tolerances that can adversely affect the foil pack thickness tolerance.

The latest development in compliant foil fluid film thrust bearings, described in U.S. Pat. No. 5,529,398 issued Jun. 25, 1996 to Robert W. Bosley entitled "Compliant Foil Hydrodynamic Fluid Film Thrust Bearing" includes a self shimming capability to compensate for variations in foil pack thickness and three (3) spring or support foils beneath the fluid foil.

SUMMARY OF THE INVENTION

In the present invention, the compliant foil fluid film thrust bearing generally comprises a single sided or two sided thrust disk rotor, fluid foils, spring /s, a thrust plate, a foil retaining housing and a spacer ring. The non-rotating but compliant fluid foils are located adjacent to the thrust face or faces of the rotatable disk. The fluid foils have open faced channels that induce regenerative vortex flow patterns in the process fluid. The forces applied by the thrust disk to the fluid foils vary inversely with fluid foil to disk gap and vary proportionally with disk deflection.

The spring foils provide a tilting pad support for the fluid foils but allow them to follow the axial and overturning motion of the disk. Each of the types of foils, namely fluid foils and spring foils are attached to the foil retaining housing by a compliant web structure and pins. The foils are formed as thin, flat, annular sheets with integral shim rings at their periphery and contoured cutout patterns that are unique to each type of foil.

As part of the forming process, the fluid foil blank is coated on one side with a compliant, wear resistant material then stamped with a forming tool to form the fluid flow channels. The thrust plate is preloaded towards the thrust surface of the foil retaining housing by a preload spring and is held away from the housing by the total thickness of the foil shim rings and the thickness of the spacer ring. This allows the bearing to essentially self shim itself to establish a small clearance between the fluid foils and the disk that is not affected by normal variations in foil or foil coating thicknesses.

The bearing has no preload force and has zero starting torque when the rotor's axis of rotation is oriented ninety degrees to the force of gravity. Owing to the vortex flow pattern of the process fluid, the bearing running clearances and load capacities are improved while lift-off speeds are reduced. In addition, good damping, low running torque and small sway space are achieved. This is all accomplished at a low manufacturing cost with a low parts count.

It is, therefore, a principal object of the present invention to provide an improved compliant foil fluid film thrust bearing.

It is another object of the present invention to provide such a bearing with enhanced axial and overturning load carrying capacity.

It is another object of the present invention to provide such a bearing with both squeeze film and coulomb damping.

It is another object of the present invention to provide such a bearing with small sway space clearances to tightly restrict bearing and thrust disk rotor deflections.

It is another object of the present invention to provide such a bearing with very low operating torque.

It is another object of the present invention to provide such a bearing with large running clearances between the fluid foil elements and the thrust disk.

It is another object of the present invention to provide such a bearing with fluid foil members that are not preloaded by spring forces against the thrust disk at zero speed.

It is another object of the present invention to provide such a bearing with zero starting torque when there is no gravity induced preload forces.

It is another object of the present invention to provide such a bearing with an extremely low lift-off/touch-down speed which is consistent with zero preload forces.

It is another object of the present invention to provide such a bearing with very low starting and stopping wear which is consistent with zero preload forces and a low lift-off/touch-down speed.

It is another object of the present invention to provide such a bearing with converging wedge channel features (formed on the surface of the fluid foil element) that limit fluid foil losses from the channel at the radial outer and radial inner edges of those channels.

It is another object of the present invention to provide such a bearing with converging wedge channel ramps formed on the surface of the fluid foil elements that have compound curve profiles with concave curvatures radially, flat slopes circumferentially at zero speed and convex curvatures at operating speed when fluid dynamic and spring forces are applied to the fluid foil elements. The profiles will form and function as scoops with radially wide fluid foil inlets, radially narrowing channel widths along the circumferential fluid foil paths, and rounded circumferentially trailing edges.

It is another object of the present invention to provide such a bearing with a fluid foil pattern that reduces fluid pressure losses when the process fluid travels "down the ramp"(in a nominally circumferential direction that is opposite to the rotation of the thrust disk) adjacent to the fluid foil element.

It is another object of the present invention to provide such a bearing with a fluid flow pattern that is regenerative with a different flow path for each regenerative flow loop.

It is another object of the present invention to provide such a bearing with a vortex flow pattern.

It is another object of the present invention to provide such a bearing with fluid flow element blanks and spring foil elements that are fabricated by optically masked chemical etch techniques.

It is another object of the present invention to provide such a bearing with foil elements that are extremely flat owing to the processes used to roll and heat treat the foil metal and the processes used to form (e.g. etch) the foil blanks and elements.

It is another object of the present invention to provide such a bearing with foil elements that have tightly held thickness tolerances.

It is another object of the present invention to provide such a bearing with fluid foil members that are single fluid foil elements, one for each side of the bearing.

It is another object of the present invention to provide such a bearing with fluid foil elements that are formed from blanks by pressing steeply sloped joggles to function as diverging wedge channels which allowing the gradually converging wedge channel ramps to result without plastic deformation as the straight line connection between the joggles.

It is another object of the present invention to provide such a bearing with fluid foil elements that are formed from annealed blanks of nickel steel, such as Inconel 750X, by pressing at room temperature.

It is another object of the present invention to provide such a bearing with a spring foil member that has local spring rates that vary with radial and circumferential location so as to accommodate variations in fluid pressure within the converging wedge channel adjacent to the local areas of the spring foil member.

It is another object of the present invention to provide such a bearing with a tilting pad spring support system that controls the relative support forces applied to the underside of the fluid foil at a multiplicity of locations circumferentially along the converging wedge channel.

It is another object of the present invention to provide such a bearing with a tilting pad spring support system having circumferentially closer spacing between support/pivot lines moving up the converging ramp from the leading edge of the fluid foil to the trailing edge of the fluid foil.

It is another object of the present invention to provide such a bearing with a tilting pad spring support system providing increasing support forces and support spring rates moving up the converging ramp from the leading edge of the fluid foil to the trailing edge of the fluid foil.

It is another object of the present invention to provide such a bearing with a tilting pad spring support system with radially curved support/pivot lines.

It is another object of the present invention to provide such a bearing with a tilting pad spring support system that assures retention of a reasonably hydrodynamically optimized scoop shape for the fluid foil converging ramps over a wide range of bearing operating speeds and bearing thrust loads.

It is another object of the present invention to provide such a bearing with foil elements that are not welded or brazed to form foil member assemblies.

It is another object of the present invention to provide such a bearing with pins (rigidly attached to the bearing housing) which position and resist rotation of the foil elements.

It is another object of the present invention to provide such a bearing with self shimming capability utilizing the resilient mounting and preload characteristics of the thrust disk, the spacer ring and the foil's self shimming rings to prevent variations in bearing axial play and sway space due to variations in foil thickness and foil coating thickness.

It is another object of the present invention to provide such a bearing with fluid foil elements, spacer ring element, thrust disk element and thrust plate element that can be installed in the thrust bearing quickly and easily.

BRIEF DESCRIPTION OF THE DRAWINGS

Figure 1:
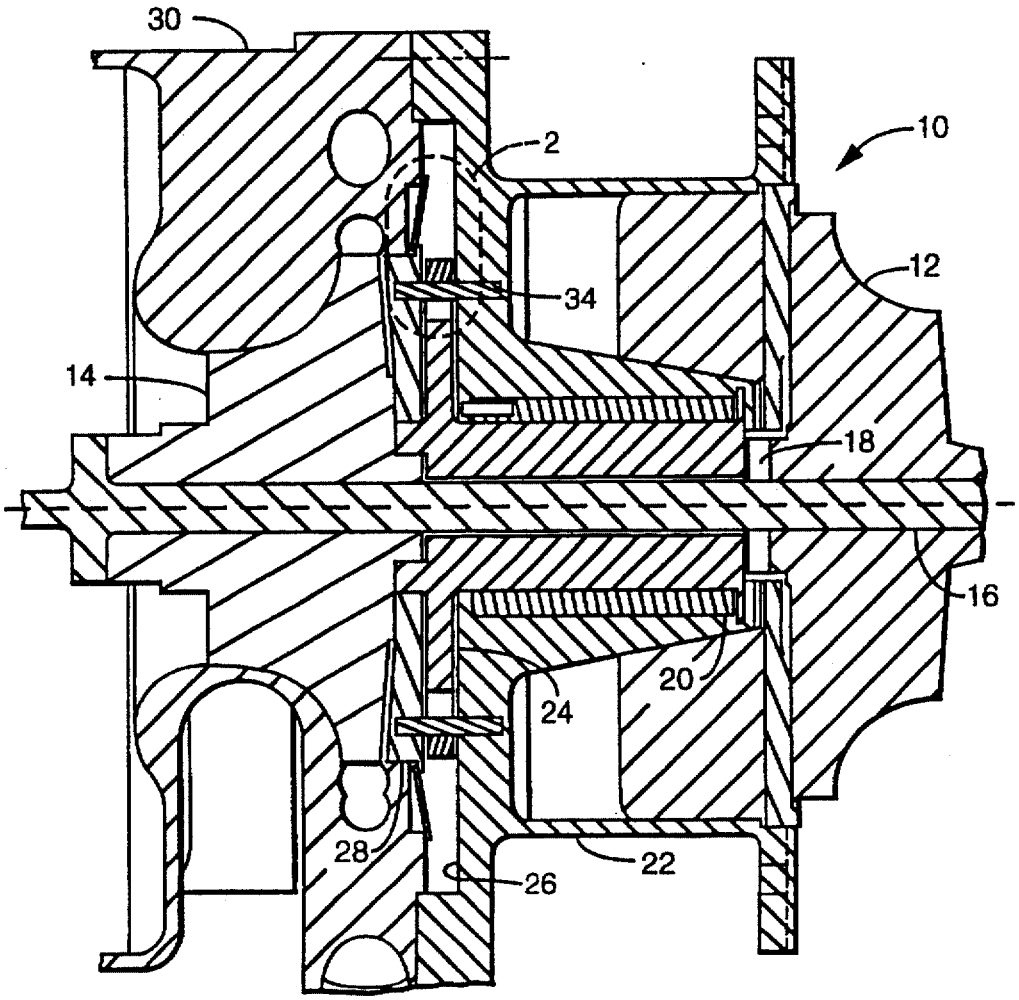
Figure 2:
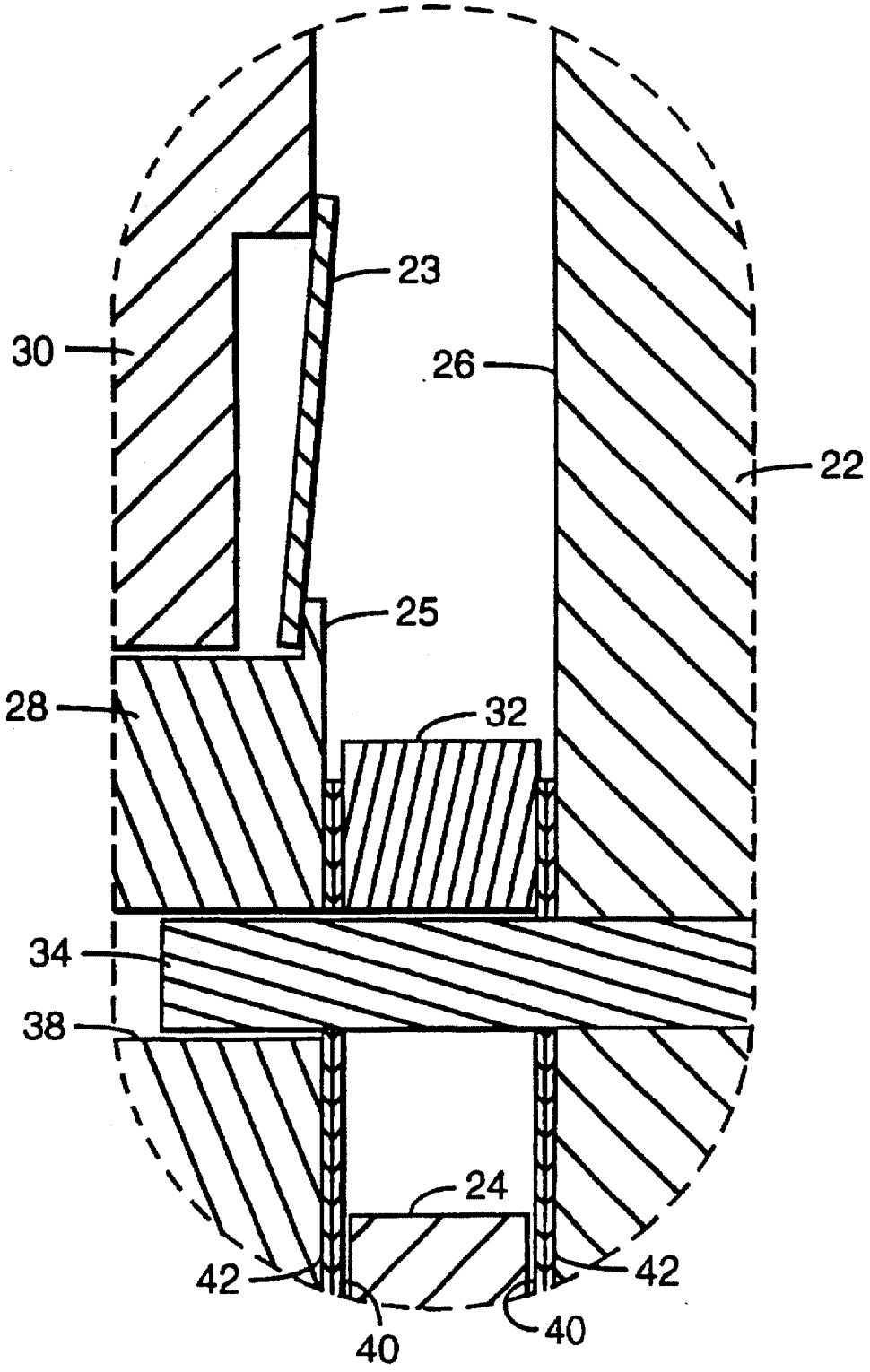
Figure 3:
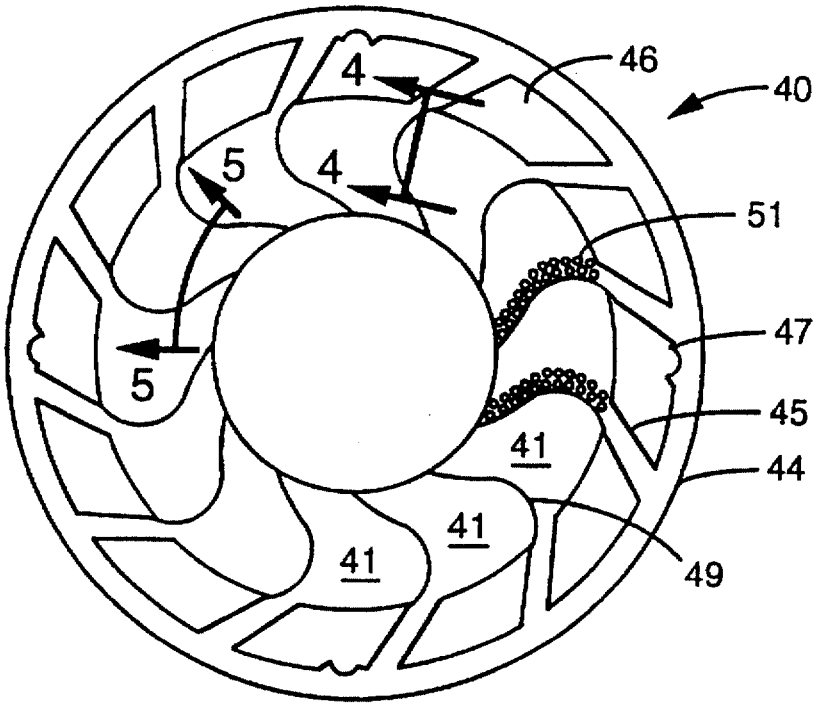
Figure 4:
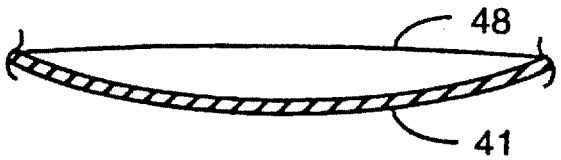
Figure 5:
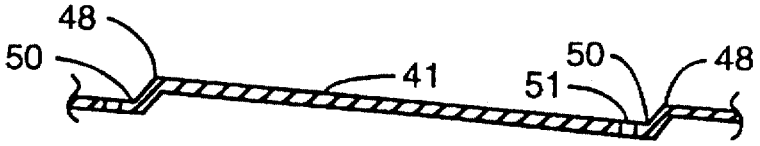
Figure 6:
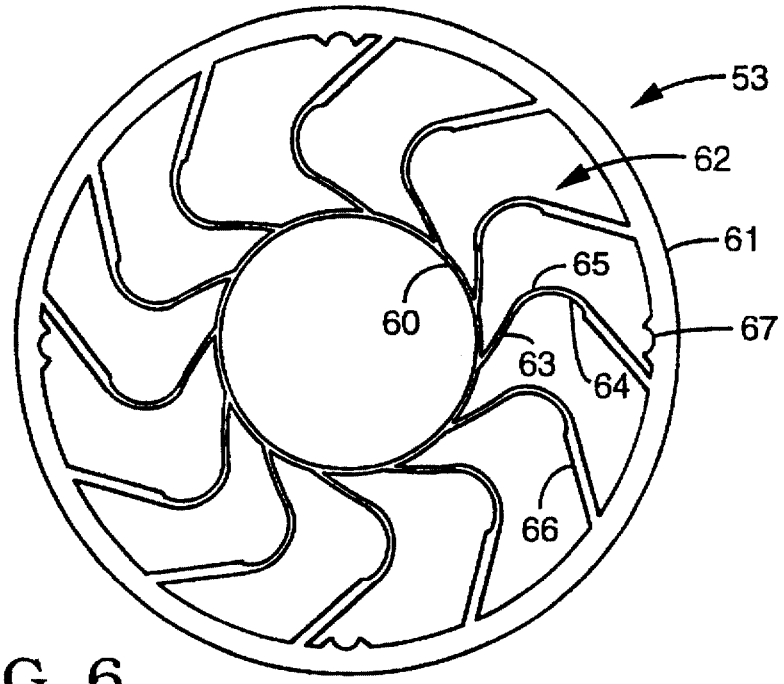
Figure 7:
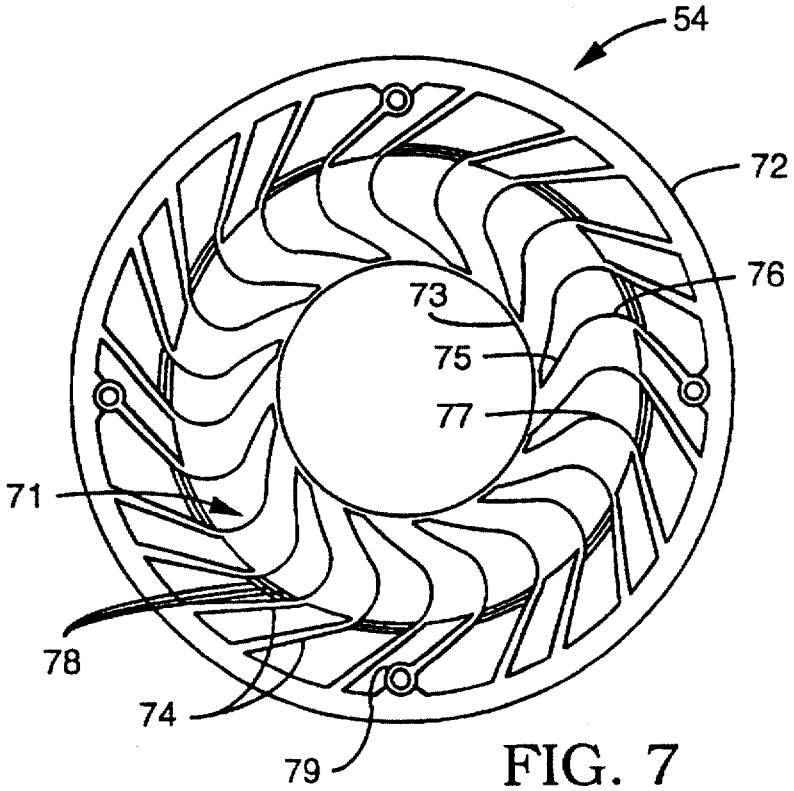
Figure 8:
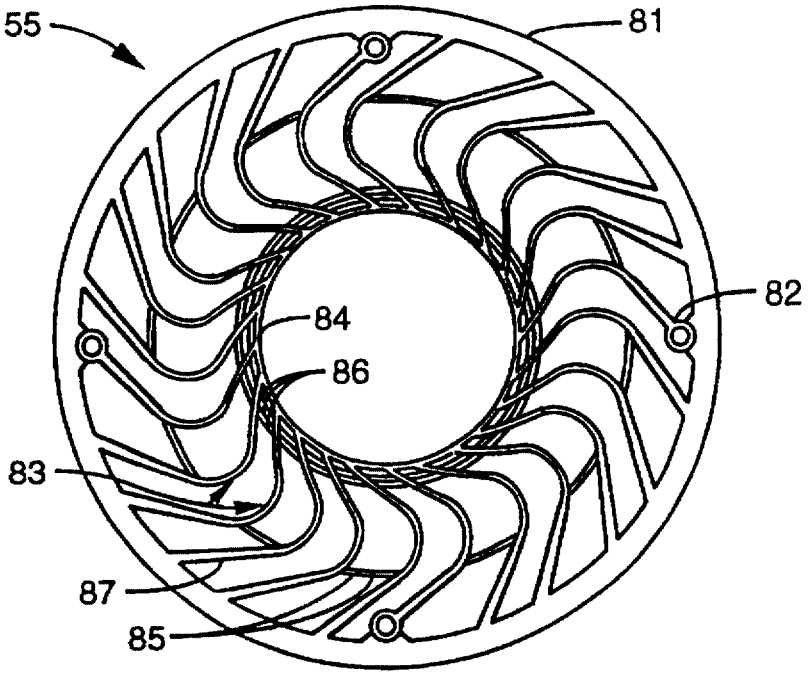
Figure 9:
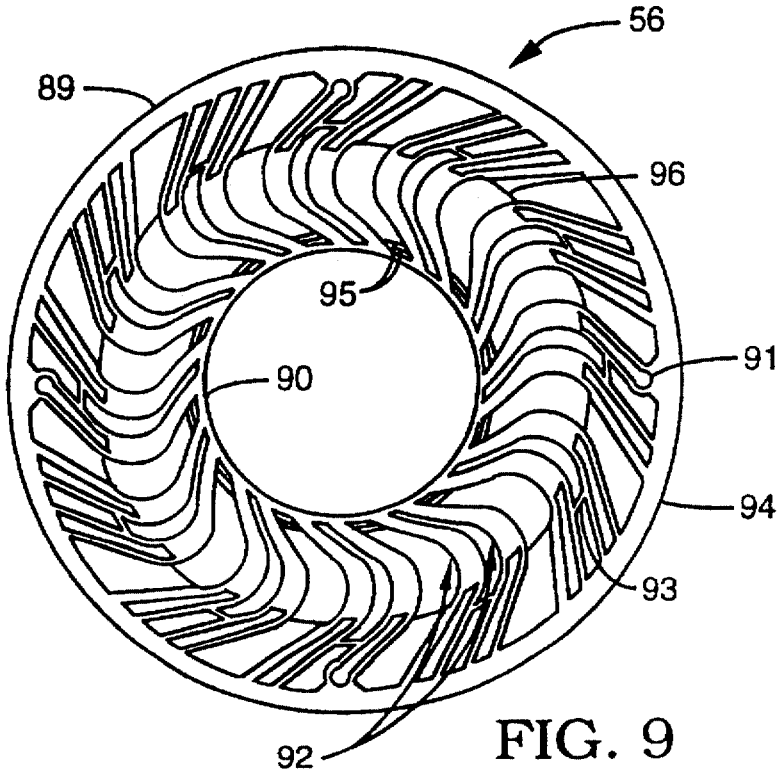
Figure 10:
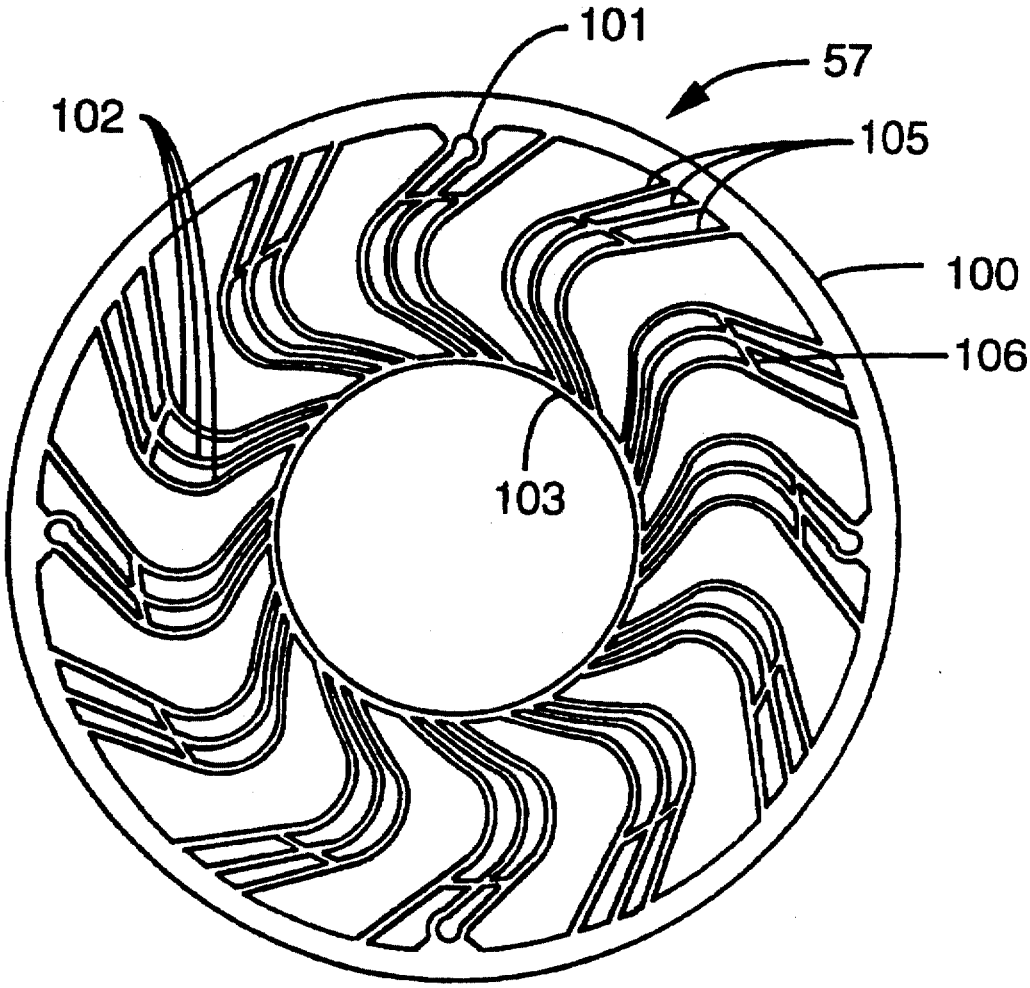
Figure 11:
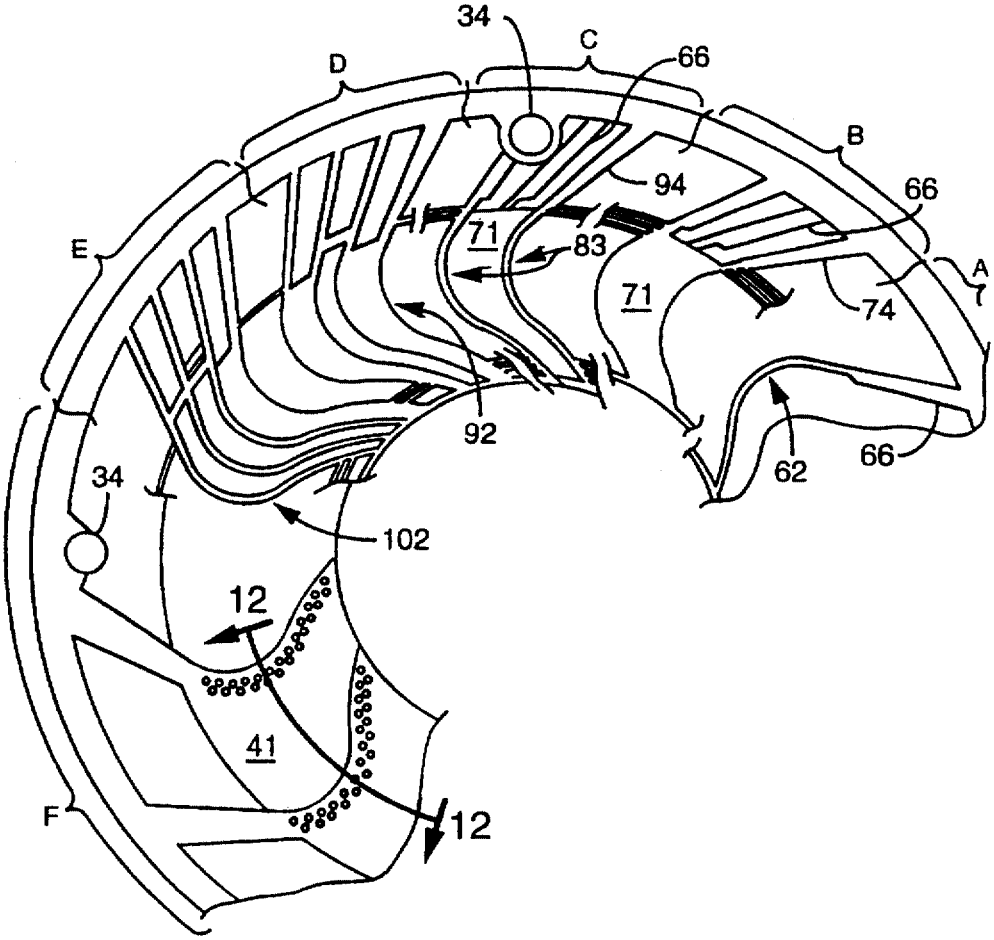
Figure 12:
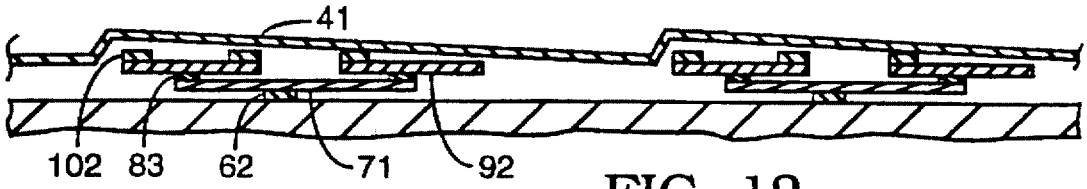
Figure 13:
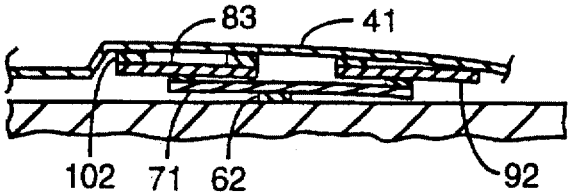
Figure 14:
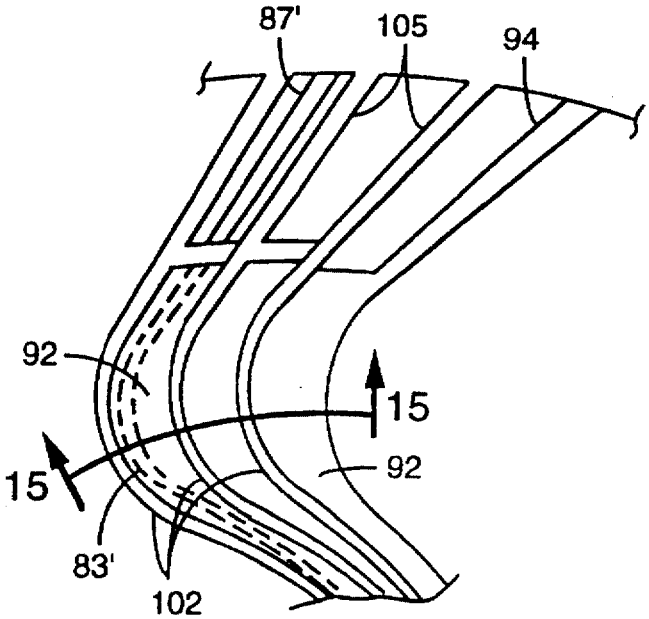
Figure 15:
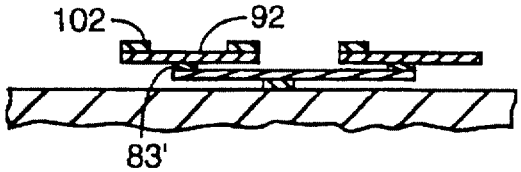
Figure 16:
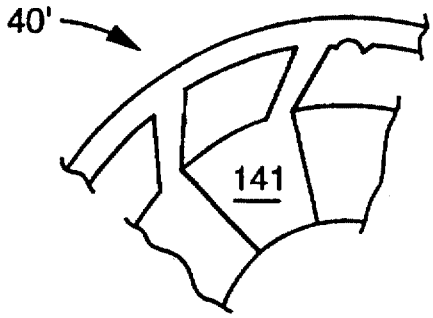
Figure 17:
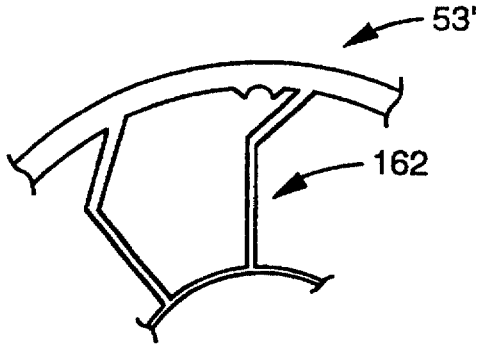
Figure 18:
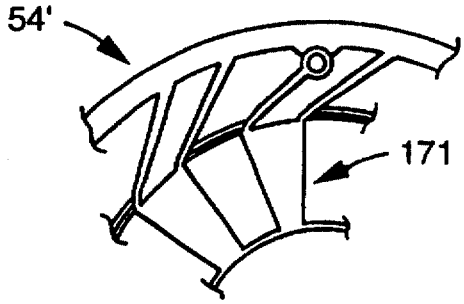
Figure 19:
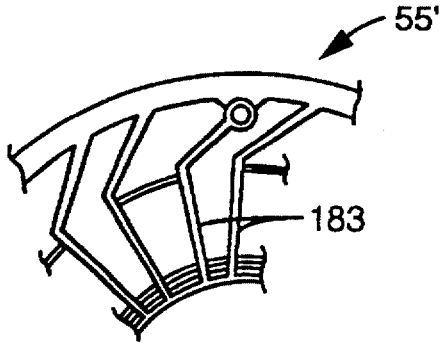
Figure 20:
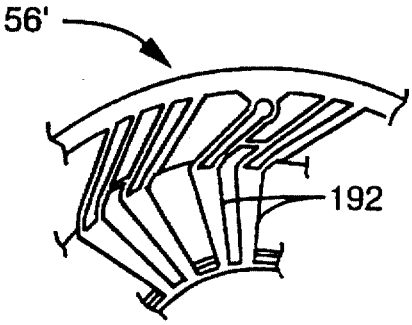
Figure 21:
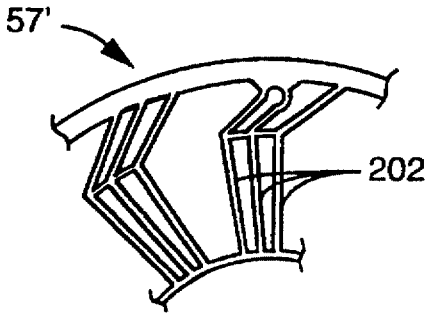

Having thus described the present invention in general terms, reference will now be made to the accompanying drawings in which:

FIG. 1 is a sectional view of a turbomachine having the compliant foil fluid film thrust bearing of the present invention;

FIG. 2 is an enlarged partial view of oval 2 of FIG. 1 illustrating the thrust plate and spacer area of the compliant foil fluid film thrust bearing of the present invention;

FIG. 3 is a plan view of the fluid foil member of the compliant foil fluid film thrust bearing of the present invention;

FIG. 4 is an enlarged sectional view of the fluid foil member of FIG. 4 taken along lines 4—4;

FIG. 5 is another enlarged sectional view of the fluid foil member of FIG. 4 taken along lines 5—5;

FIG. 6 is a plan view of the outer spring foil element of the spring foil member of the compliant foil fluid film thrust bearing of the present invention;

FIG. 7 is a plan view of the intermediate outer spring foil element of the spring foil member of the compliant foil fluid film thrust bearing of the present invention;

FIG. 8 is a plan view of the middle spring foil element of the spring foil member of the compliant foil fluid film thrust bearing of the present invention;

FIG. 9 is a plan view of the intermediate inner spring foil element of the spring foil member of the compliant foil fluid film thrust bearing of the present invention;

FIG. 10 is a plan view of the inner spring foil element of the spring foil member of the compliant foil fluid film thrust bearing of the present invention;

FIG. 11 is a plan view, partially cut away foil-by-foil, of the complaint foil fluid film thrust bearing of the present invention;

FIG. 12 is a sectional view of the unloaded fluid foil member and spring foil member of FIG. 11 taken along line 12—12;

FIG. 13 is a sectional view of the loaded fluid foil member and spring foil member of FIG. 11 taken along line 12—12;

FIG. 14 is a plan view of an alternate compliant foil fluid film thrust bearing of the present invention;

FIG. 15 is a sectional view of the alternate compliant foil fluid foil thrust bearing of FIG. 14 taken along line 15—15; and FIG. 16 is a partial plan view of the fluid foil member of an another alternate compliant foil fluid film thrust bearing of the present invention;

FIG. 17 is a partial plan view of the outer spring foil element of the spring foil member used with the fluid foil member of the alternate compliant foil fluid film thrust bearing of FIG. 16;

FIG. 18 is a partial plan view of the intermediate outer spring foil element of the spring foil member used with the fluid foil member of the alternate compliant foil fluid film thrust bearing of FIG. 16;

FIG. 19 is a partial plan view of the middle spring foil element of the spring foil member used with the fluid foil member of the alternate compliant foil fluid film thrust bearing of FIG. 16;

FIG. 20 is a partial plan view of the intermediate inner spring foil element of the spring foil member used with the fluid foil member of the alternate compliant foil fluid film thrust bearing of FIG. 16; and FIG. 21 is a partial plan view of the inner spring foil element of the spring foil member used with the fluid foil member of the alternate compliant foil fluid film thrust bearing of FIG. 16.

DETAILED DESCRIPTION OF THE PREFERRED EMBODIMENTS

A turbomachine utilizing the compliant foil fluid film thrust bearing of the present invention is illustrated in FIG. 1. The turbomachine 10 generally includes turbine wheel 12 and compressor wheel 14 at opposite ends of a common shaft or tie bar 16. The thrust and radial bearing rotor 18 is disposed around the tie bar 16 between the turbine wheel 12 and the compressor wheel 14. A journal bearing cartridge 20 in center bearing housing 22 rotatably supports the bearing rotor 18.

The compressor end of the bearing rotor 18 includes a radially extending thrust disk 24 which extends into a recess 26 in the compressor end of the center bearing housing 22. A bearing thrust plate 28 is disposed on the opposite side of the bearing rotor thrust disk 24. The outer periphery of the compressor end of the center bearing housing 22 engages the compressor housing 30.

As best illustrated in FIG. 2, a thrust bearing spacer 32 is positioned radially outward from the thrust disk 24 of the bearing rotor 18 and is positioned radially by a plurality of circumferentially spaced pins 34 which are fixed in holes 38 in the recess 26 of the center bearing housing 22 and extend into holes 38 in the thrust bearing plate 28. A thrust bearing fluid foil member 40 and thrust bearing spring foil member 42 are disposed on either side of the bearing rotor thrust disk 24 and thrust bearing spacer 32. On one side, the fluid foil member 40 and spring foil member 42 are positioned in the recess 26 of the center bearing housing 22 and on the other side they are adjacent to the bearing thrust plate 28. The fluid foil member 40 and spring foil member 42 are held in position radially and circumferentially by the pins 34 which extend from the center bearing housing 22, through holes in one spring foil element 42, through holes in one fluid foil element 40, traverse the bore of the thrust bearing spacer 32, through holes in the opposite side fluid foil element 40, the holes in the opposite side spring foil member 42 and into holes 38 in the bearing thrust plate 28. The bearing thrust plate 28 is biased towards the center bearing housing 22 by a Belleville washer 23 disposed between the lip 25 on the bearing thrust plate 28 and the compressor housing 30.

The thickness of the thrust bearing spacer 32 is several thousandths of an inch greater than the thickness of the bearing rotor thrust disk 24. Variations in the foil or foil coating thicknesses inherently cause compensating variations in the spacing between the thrust plate 28 and the housing 22. Thus, variations in bearing sway space and bearing compliance due to foil thickness tolerances are prevented.

FIGS. 3–5 illustrate a fluid foil member 40 integrally formed from a single flat disk termed a foil blank. A plurality of individual fluid foils 41 are formed from a flat sheet of a nickel steel such as Inconel 750X by room temperature pressing steeply sloped joggles to function as diverging wedge channels while allowing the gradually converging wedge channel ramps to result without plastic deformation as the straight line connection between the joggles. The fluid foil members would normally be annealed both during forming and use and may be coated prior to forming the joggles with any number of a myriad of low friction or friction reducing coating materials which can protect the metal from abrasion during starting and stopping, and inadvertent and occasional high speed touch-downs. The coating would also provide for some embedment of contamination particles.

The individual fluid foils 41 (shown as twelve) are generally chevron shaped and connected to an outer self shimming ring 44 by support webs 45. Fluid passages or openings 46 are formed between adjacent support webs 45. Every fourth fluid passage 46 includes an indexing tab 47. Each aerodynamic foil 41 has a trailing edge 48 with a rounded trailing point or nose 49 and a leading edge 50 a generally straight ramped contour from the leading edge 50 to the trailing edge 48. The individual fluid foils 41 have a generally scoop shape as best illustrated in the two sectional views of FIGS. 4 and 5. One or two rows of openings 51 are provided at the leading edge 50 of each individual fluid foil 41 to allow fluid to enter the leading edge of the converging ramp adjacent to the thrust disk from under the fluid foil in the area of the spring foil members 42.

As illustrated in FIGS. 6–10, the thrust bearing spring foil member 42 generally comprises an outer spring foil element 53 (FIG. 6), an intermediate outer spring foil element 54 (FIG. 7), a middle spring foil element 55 (FIG. 8), an intermediate inner spring foil element 56 (FIG. 9), and an inner spring foil element 57 (FIG. 10).

The outer support foil element 53, shown in FIG. 6, generally includes an inner connector ring 60 and an outer self shimming ring 61 with a plurality (shown as twelve) of narrow width spring foils 62 extending therebetween. The narrow spring foils 62 consist of an inner curved foil section 63 extending outward from the inner connector ring 60 at a forward angle (in the direction of the thrust disk's rotary motion) and an outer curved foil section 64 extending inward from the self shimming ring 61 at a forward angle. The inner and outer foil sections 63,64 are nominally oriented approximately forty degrees from circumferential at all points along their length and join together to form a generally nose-shaped foil section 65. The outer foil sections 64 are individually connected to the outer self shimming ring 61 by a radially extending connector or supporting web 66.

The narrow spring foil 53 is narrowest at the connection to the inner connector ring 60 and gradually increases in width to the point or tip of the nose 65 and continues to gradually increase in width in the outer foil section 64 to the connector web 66. The connector web 66 is of an even greater, generally radially increasing, width. A plurality of indexing tabs 67 (shown as four) extend inward from the outer self shimming ring 61 in order to enable precise alignment of the outer support foil element 53 with the other elements of the thrust bearing spring foil member 42 and with the fluid foil member 40.

The intermediate outer support foil element 54, shown in FIG. 7, generally includes an inner connector ring 73 and an outer self shimming ring 72 with a plurality (shown as twelve) of wide spring pads or foils 71 extending therebetween. The wide spring foils 71 consist of an inner curved foil section 75 extending outward from the inner connector ring 73 at a forward angle and an outer curved foil section 76 extending inward from the self shimming ring 72 at a forward angle. The inner and outer foil sections 75, 76 join together to form a generally nose-shaped foil section 77. Each of the outer foil sections 76 are individually connected to the outer self shimming ring 72 by a pair of radially extending connector or supporting webs 74. A plurality of concentric outer dam rings 78 (shown as three) extend between the adjacent wide spring foils 71 generally where the wide spring foils 71 and the pair of webs 74 connect.

The wide spring foil 71 is narrowest at the connection to the inner connector ring 73 and gradually increases in width to the point or tip of the nose 77 and continues to gradually increase in width in the outer foil section 76 to the connector webs 74. A plurality of indexing tabs 79 (shown as four) extend inward from the outer self shimming ring 72 in order to enable precise alignment of the outer support foil element 54 with the other elements of the thrust bearing spring foil member 42 and with the fluid foil member 40.

The middle spring foil element 55 is illustrated in FIG. 8 and includes an outer self shimming ring 81 and indexing tabs 82 identical to and aligned with the corresponding elements in the outer spring foil element 53, intermediate outer spring foil element 54 and fluid foil member 40. A plurality of pairs (shown as twelve) of generally nose-shaped narrow spring foils 83 extend between the inner connector ring 84 and the outer self shimming ring 81. Each of the pair of narrow spring foils 83 generally straddle the narrow spring foils 62 of the outer spring foil element 53 and are aligned at the leading and trailing edges of the wide spring foil 71.

A connector web 87 joins each of the narrow spring foils 83 to the outer self shimming ring 81. A plurality of concentric outer dam rings 85 (shown as two) extend between adjacent pairs of narrow spring foils 83 where they connect to webs 87. A plurality of concentric inner dam rings 86 (shown as three) extend between adjacent pairs of narrow spring foils 83 near the inner connector ring 84.

FIG. 9 illustrates the intermediate inner spring foil element 56 which has an outer self shimming ring 89 and indexing tabs 91 which are common to the spring foil member 42. The plurality of pairs of intermediate width spring foil elements 92 (shown as twelve) are disposed between the outer self shimming ring 89 and an inner connector ring 90. Each of said pair of intermediate width spring foil elements are connected to the outer self shimming ring by a pair of webs 94. By intermediate width is meant a width between the width of the narrow width outer and inner foils 62, 83 and the width of the wide intermediate outer foil 71.

Each of the pairs of webs 94 for the intermediate width foils are joined by a circumferential stiffening ring 93. In addition, a single outer dam ring 96 (which could alternately be a plurality of dam rings) and a plurality (shown as two) of concentric inner dam rings 95 extend between adjacent pairs of intermediate width foils 92, at the connection to the webs 94 and adjacent to the inner connector ring 90, respectively. Each of the pair of intermediate width foils 92 generally are positioned over one of said pair of narrow width spring foils 83 of the middle spring foil member 55.

The inner spring foil element 57 is illustrated in FIG. 10 and includes an outer self shimming ring 100 and indexing tabs 101 identical to and aligned with the corresponding elements in the other spring foil elements 53, 54, 55, and 56 and fluid foil member 40. A plurality of trios (shown as twelve) of generally nose-shaped narrow spring foils 102 extend between the inner connector ring 103 and the outer self shimming ring 100. Each of the trio of narrow spring foils 102 have widths that are generally the same as the narrow spring foils 62 of the outer spring foil element 53 and the pairs of narrow spring foils 83 of the middle spring foil element 55. Of the trio of narrow spring foils 102, two are aligned at the leading and trailing edges of one of the pair of intermediate width spring foils 92 and the third of the trio of narrow spring foils are aligned with the trailing edge of the other of the pair of intermediate width spring foils 92.

A connector web 105 joins each of the trio of narrow spring foils 102 to the outer self shimming ring 100. These webs 105 of each trio of narrow spring foils 102 are joined together by a circumferential stiffening ring 106.

The precise relationship of the fluid foil member 40 and spring foil member 42, including the five spring foil elements 53, 54, 55, 56 & 57, is best illustrated in FIGS. 11–13. FIG. 11 is a plan view of the assembled fluid foil member 40 and spring foil member 42 with the individual spring foil elements overlain and positioned by their respective indexing tabs. Proceeding in a counterclockwise rotation, the individual spring foil elements are individually cut away in a foil-by-foil manner to show their relationship with each other.

The outer spring foil 62 is shown in the arc identified as "A". Arc "B" illustrates the outer intermediate foil 71 aligned over the outer spring foil 62. A pair of middle spring foils 83 are laid over the outer spring foil 62 and intermediate spring foil 71 in arc "C". Arc "D" then includes the pair of intermediate inner foils 92 and finally the trio of inner foils 102 are shown over the pair of intermediate inner foils 92 in arc "E". The fluid foils 41 are then laid over the assembled spring foils in arc "F".

An even more precise relationship of the various foils is illustrated in FIGS. 12 and 13. FIG. 12 illustrates an unloaded fluid foil member and spring foil member while a loaded fluid foil member and spring foil member are shown in FIG. 11. It should be noted that the foil 62 is located nearer to the trailing edge of foil 71 than to the leading edge of foil 71. Foils 83 are located nearer the trailing edge of foils 92 than to the leading edge of foils 92. This assures that the tilting pad spring support will deliver more force to the underside of the fluid foil 40 near its trailing edge 48 than its leading edge 50.

The fluid foil blank, as well as the individual elements of the thrust bearing spring foil member 42, can be formed from flat metal sheets by optically masked chemical etch techniques. Nickel steels, such as Inconel 750X for the fluid foil and Inconel 718 for the spring foil elements can be used. Typically, foil thicknesses are between 0.004 inches and 0.007 inches. The nickel steel metal sheets from which the foil elements are formed normally are heat treated to full hardness in a vacuum oven (1300 degrees Fahrenheit for about twenty hours for Inconel 750X). The five individual elements of the thrust bearing spring foil member 42 can be assembled by stacking the spring foil elements without bonding. The relative micro movement of these foils in use provides coulomb damping.

The shape of the fluid foils 41, namely an open-faced channel having a converging width and sloping "walls", induces regenerative vortex flow patterns in the process fluid across the fluid foil. The process fluid generally enters the leading surface of the foil 41 from the trailing edge 48 of the preceding foil. Any make-up process fluid is provided from the inner and outer diameter of the leading edge or from openings 51. There is some fluid leakage flow from the inner diameter and outer diameter, respectively, near the trailing edge 48.

The compliant fluid foil members 40 are located adjacent to the two thrust faces of the thrust disk 24. The spring foil members 42 provide support for the fluid foil members 40 but allow them to follow the axial and overturning motion of the disk 24. The forces applied by the fluid foil members to the thrust disk through the process fluid vary inversely with foil to disk gap and vary proportionally with disk deflection.

The thrust plate 28 is held away from the center bearing housing 22 by the total thickness of the outer self shimming rings of the fluid foil members 40 and spring foil members 42 and the thickness of the thrust bearing spacer 32. The thrust bearing spacer 32 is slightly thicker than the thrust disk 24 so that there is a small clearance between the fluid foil member 40 and the thrust disk 24 that is not affected by normal variations in foil or foil coating thickness. The bearing has no preload force and has zero starting torque when the disk's axis of rotation is oriented ninety degrees to the force of gravity. With the regenerative vortex flow pattern established by the contour of the fluid foil elements, the bearing running clearances are significantly improved (increased) and lift-off speeds are significantly less than previously possible.

The converging wedge channel ramps formed in the surface of the fluid foil members have compound curve profiles with concave curvatures radially, flat slopes circumferentially at zero speed and convex curvatures at operating speed when fluid dynamic and spring forces are applied to the foil elements. The tilting pad support for the fluid foil elements assures a near optimum convex curvature circumferentially over a wide range of bearing thrust loads. The profiles will form and function as scoops with radially wide fluid flow inlets, a radially narrowing channel width along the circumferential fluid foil paths, and rounded circumferentially trailing edges. This multi-path regenerative vortex fluid foil pattern reduces fluid pressure losses when the process fluid travels "down the ramp" in a nominally circumferential direction that is opposite to the rotation of the thrust disk adjacent to the fluid foil member.

The particular tilting pad bearing of the present invention has five spring foils and a fluid foil. The five spring foil elements have four support lines for each fluid foil ramp. The relative force exerted at each of these support lines is proportionally controlled by the circumferential spacing between several curved spring foil lines that generally match the curved shape of the formed fluid foil.

The outer spring foil element 53 has twelve individual narrow width spring foils 62 adjacent to either the thrust disk on one side of the thrust bearing or to the thrust surface of the housing on the other side of the thrust disk. Each of these narrow spring foils 62 provides a curved, generally nose shaped support line.

The wide intermediate outer spring foils 71 are supported by the individual narrow spring foils 62 and can articulate both by flexing and by tilting on the single support line of the narrow spring foils 62 to either a nose up or nose down position as required by the rest of the thrust bearing.

Above the wide spring foils 71 are the pair of narrow width spring foils 83 which provide two support lines per ramp and can give support at the nose and the leading edge of the wide spring foils 71. The two foil support lines of narrow spring foils 83 push underneath and near the peripheral center of each of the two pairs of intermediate width foils 92 so that these intermediate width foils 92 can tilt nose up or nose down as required. Lastly, narrow width spring foils 102 have three support lines, one at the trailing edge of the leading spring foil 92, one at the leading edge of the trailing spring foil 92 and one at the trailing edge of the trailing spring foil 92.

Effectively, intermediate width foil 92 provide a line of support pushing on the underside of the fluid foil relatively close to the start of the converging ramp, and then the next three support lines moving up the ramp are provided to the fluid foil through spring foil 102. This makes the entire spring structure behave like the articulated supports of tank treads, where as you go over uneven ground the tank treads themselves can articulate because you have a support structure that articulates. The circumferential spacing between these various support lines, now referring to the support lines of spring foil elements 53, 55, 56, and 57, control the percentage of the total force coming through the spring foil elements which is delivered to each circumferential location on the fluid foil above the spring foil element 57.

The highest spring force will be at the nose of the formed fluid foil where the fluid compressed pressure is highest. The support forces and the spring rates produced are lower when moving away from the spring foil nose. While these foil elements are primarily tilting members to allow compliance to the fluid foil, they also have spring properties in their own right.

The concentric dam rings of spring foil elements 54, 55, and 56 effectively serve as dams to limit leakage out of the thrust bearing particularly when the bearing is operated hydrostatically. The thrust bearing of the present invention is particularly useful in a hydrostatically augmented thrust bearing such as described in U.S. patent application Ser. No. 08/622,250 filed Jun. 14, 1996 by Robert W. Bosley and Ronald F. Miller entitled "Hydrostatic Augmentation of a Compliant Foil Hydrodynamic Fluid Film Thrust Bearing", incorporated herein by reference. The openings 51 at the leading edge of the fluid foil 41 are specifically provided for this hydrostatic augmentation. The thrust bearing will, however, function as a hydrodynamic thrust bearing with or without openings 51.

The tilting pad thrust bearing operates with its fluid foil flexed circumferentially in a convex fluid dynamically optimized shape on the surface adjacent to the thrust disk without relying upon air pressure in the spring area. Air pressure will, however, provide additional convex shaping and load capacity and provide good adaptability.

While the nose shape of the individual spring foils has been shown to be relatively identical for the five spring foils and the fluid foil, the shape of the spring foil nose can be varied to control the spring rate. As illustrated in FIGS. 14 and 15, the nose of the trailing edge of middle spring foil 83' can be sharper, that is have a smaller radius than the noses of the trailing edge of inner spring foil 102 and intermediate inner spring foil 92. This will stiffen up the spring rate at the end of the converging ramp so that there will be less fluid flow leakage and provide greater support for the fluid foil nose.

The generally scoop-shaped converging wedge channels formed on the surface of the fluid foil members induce vortex fluid foil patterns and limit process fluid foil losses from the channels at the radial inner and outer edges of the foils. This, together with the self shimming construction and other features of the present invention, provides a thrust bearing having a high load carrying capacity, good damping, small sway clearances, low running torque, high running foil to disk clearances, zero preload force, low starting torque, low lift-off/touch-down speeds, and low wear. In addition, all of this is achieved with a low parts count, low manufacturing cost, and ease of assembly.

Further, the fluid foil members and spring foil elements can have a straight radial shape as shown in FIGS. 16–21. Except for having a straight radial shape rather than the nose shape previously described, the fluid foil member 40' having straight radial foils 141 and spring or support foil members 53', 54', 55', 56', and 57' would function generally the same and have the same relative spacing and relative positioning with respect to each other. The outer support foil element 53' of FIG. 17 includes narrow width radial spring foils 162, intermediate outer support foil element 54' of FIG. 18 includes wide radial pads or foils 171, middle support foil element 55' of FIG. 19 includes pairs of narrow width radial spring foils 183, intermediate inner support foil element 56' of FIG. 20 includes pairs of wide radial spring pads or foils 192, while inner support foil element 57' of FIG. 21 includes trios of narrow width radial spring foils 202. The generally flat (radially) fluid foil surfaces, and underlying spring foils which maintain generally flat (radially) fluid foil surfaces of FIGS. 16–21, are not intended to establish a scoop shaped converging ramp and therefor do not generate vortex regenerative process fluid flows.

While specific embodiments of the invention have been illustrated and described, it is to be understood that these are provided by way of example only and that the invention is not to be construed as being limited thereto but only by the proper scope of the following claims.

What I claim is:

1. A method of rotatably supporting a thrust disk on a thrust plate comprising the steps of:

providing a compliant foil bearing between said thrust disk and said thrust plate, said compliant foil bearing including an annular compliant fluid foil member having a plurality of converging ramps and diverging joggles to form alternating converging and diverging wedge channels on the surface of said annular compliant fluid foil member facing said thrust disk;

mounting a spring foil member between said compliant fluid foil bearing member and said thrust plate;

providing said spring foil member with a plurality of spring foil elements having a number of narrow width spring foils and a plurality of spring foil elements having a number of wide spring pads; and creating a tilting pad support for said compliant fluid foil bearing member by alternating individual ones of said plurality of said narrow width spring foil elements and individual ones of said plurality of wide spring pad spring foil elements.

2. A compliant foil fluid film thrust bearing comprising:

a thrust disk rotatably supported by a non-rotating thrust bearing surface; and a compliant foil bearing operably disposed between said rotatable thrust disk and said non-rotating thrust bearing surface and mounted on said thrust bearing surface, said compliant foil bearing including a fluid film member having a plurality of converging ramps and diverging joggles to form alternating converging and diverging wedge channels on the surface of said compliant fluid foil member facing said rotatable thrust disk, and a spring foil member mounted on said thrust bearing surface and disposed between said thrust bearing surface and said fluid foil member, said spring foil member including means to form a tilting pad support for said fluid foil member.

3. The compliant foil fluid film bearing of claim 2 wherein said means to form a tilting pad support for said fluid foil member has circumferentially closer spacing between support/pivot lines moving up the individual converging ramps of said fluid foil member to the trailing edge of the individual converging ramps of said fluid foil member.

4. The compliant foil fluid film bearing of claim 3 wherein said support/pivot lines moving up the individual converging ramps of said fluid foil member to the trailing edge of the individual converging ramps of said fluid foil member number three.

5. The compliant foil fluid film bearing of claim 3 wherein said support/pivot lines moving up the individual converging ramps of said fluid foil member to the trailing edge of the individual converging ramps of said fluid foil member number four.

6. The compliant foil fluid film bearing of claim 2 wherein said means to form a tilting pad support for said fluid foil member has increasing support forces and support spring rates moving up the individual converging ramps of said fluid foil member to the trailing edge of the individual converging ramps of said fluid foil member.

7. The compliant foil fluid film bearing of claim 2 wherein said means to form a tilting pad support for said fluid foil member assures retention of a reasonably hydrodynamically optimized scoop shape for the individual converging ramps of said fluid foil member over a wide range of bearing operating speeds and bearing thrust loads.

8. A compliant foil fluid film thrust bearing comprising:

a thrust disk rotatably supported by said thrust bearing surface; and a compliant foil bearing operably disposed between said rotatable thrust disk and said thrust bearing surface and mounted on said thrust bearing surface, said compliant foil bearing including a fluid foil member having a plurality of converging ramps and diverging joggles to form alternating converging and diverging wedge channels on the surface of said compliant fluid foil member facing said rotatable thrust disk, and a spring foil member mounted on said thrust bearing surface and disposed between said thrust bearing surface and said fluid foil member, said spring foil member including means to provide narrow pivot supports and to provide flexure and tilting supports for said fluid foil member.

9. The compliant foil fluid film bearing of claim 8 wherein said narrow pivot supports are radially curved.

10. The compliant foil fluid film bearing of claim 9 wherein said narrow pivot supports have a generally chevron shape with a generally blunt nose.

11. The compliant foil fluid film bearing of claim 8 wherein said narrow pivot supports are radially straight.

[12. A compliant foil fluid film thrust bearing comprising:

a thrust disk rotatably supported by said thrust bearing surface; and a compliant foil bearing operably disposed between said rotatable thrust disk and said thrust bearing surface and mounted on said thrust bearing surface, said compliant foil bearing including a fluid foil member having a plurality of converging ramps and diverging wedge channels on the surface of said compliant fluid foil member facing said rotatable thrust disk, and a spring foil member mounted on said thrust bearing surface and disposed between said thrust bearing surface and said fluid foil member, said spring foil member including a plurality of narrow width spring foil elements and at least one wide spring pad element with said wide spring elements disposed between adjacent narrow width spring foil elements to form a tilting pad support for said fluid foil member.]

13. [The compliant foil fluid film bearing of claim 12] *A compliant foil fluid film thrust bearing comprising:*

*a thrust disk rotatably supported by said thrust bearing surface; and*

*a compliant foil bearing operably disposed between said rotatable thrust disk and said thrust bearing surface and mounted on said thrust bearing surface, said compliant foil bearing including a fluid film member having a plurality of converging ramps and diverging joggles to form alternating converging and diverging wedge channels on the surface of said compliant fluid foil member facing said rotatable thrust disk, and a spring foil member mounted on said thrust bearing surface and disposed between said thrust bearing surface and said fluid foil member,*

*said spring foil member including a plurality of narrow width spring foil elements and at least one wide spring pad element with said wide spring elements disposed between adjacent narrow width spring foil elements to form a tilting pad support for said fluid foil member,* wherein said spring foil member includes three narrow width spring foil elements and two wide spring pad elements.

14. A compliant foil fluid film thrust bearing comprising:

a thrust disk rotatably supported by said thrust bearing surface; and a compliant foil bearing operably disposed between said rotatable thrust disk and said thrust bearing surface and mounted on said thrust bearing surface, said compliant foil bearing including a fluid foil member having a plurality of converging ramps and diverging joggles to form alternating converging and diverging wedge channels on the surface of said compliant fluid foil member facing said rotatable thrust disk, and a spring foil member mounted on said thrust bearing surface and disposed between said thrust bearing surface and said fluid foil member, said spring foil member including means to provide single narrow pivot supports and single flexure and tilting supports for said fluid foil member, pairs of pivot supports and pairs of flexure and titling supports, and trios of narrow pivot supports, said single narrow pivot supports, single flexure and tilting supports, pairs of pivot supports, pairs of flexure and titling supports, and trios of narrow pivot supports sequentially arranged together to form a tilting pad support for said fluid foil member.

15. A compliant foil fluid film thrust bearing comprising:

a bearing housing having a thrust bearing surface and a generally opposed thrust bearing plate;

a shaft rotatably supported within said bearing housing and including a thrust disk radially extending between said thrust bearing surface and said opposed thrust bearing plate;

a pair of annular compliant fluid foil members with one of said pair of members disposed on either side of said thrust disk and each of said pair of annular compliant fluid foil members including a plurality of converging ramps and diverging joggles to form alternating converging and diverging wedge channels on the surface facing said thrust disk;

a pair of annular spring foil members with one of said pair of members disposed between an annular compliant fluid foil member and said thrust bearing surface and the other of said pair of annular spring foil members disposed between said other of said pair of annular compliant fluid foil members and said thrust bearing plate and each of said annular spring foil members including means to form a tilting pad support for said fluid foil member.

16. The compliant foil fluid film bearing of claim 15 wherein the periphery of each of said pair of annular compliant fluid foil members includes a self-shimming peripheral ring and the periphery of each of said pair of annular spring foil members includes a self-shimming peripheral ring:

in addition a bearing spacer disposed between said pair of annular compliant fluid foil members at the outer periphery of said thrust disk and said bearing spacer having an axial thickness slightly greater than the axial thickness of said thrust disk such that the thickness of said pair of annular compliant fluid foil member peripheral rings, the thickness of said pair of annular spring foil member peripheral rings and the thickness of said bearing spacer together establishing a clearance between the annular compliant fluid foil elements and said rotating thrust disk; and wherein each of said pair of annular compliant fluid foil members and each of said pair of annular spring foil members include a plurality of peripheral tabs having indexing openings therein and, in addition, said bearing includes a like plurality of pins with individual pins extending from said bearing housing through said annular compliant fluid foil members, said annular spring foil members, said bearing spacer and into said thrust bearing plate.

17. The compliant foil fluid film thrust bearing of claim 15 wherein said pair of annular spring foil members includes spring foil elements which have arcuate dams at the radially outward and radially inward periphery of said tilting pad supports.

18. The compliant foil fluid film thrust bearing of claim 15 wherein said converging wedge channels are generally scoop shaped chevrons.

19. The compliant foil fluid film thrust bearing of claim 18 wherein said spring foil members includes a plurality of narrow width spring foil elements and at least one wide spring pad element with said wide spring elements disposed between adjacent narrow width spring foil elements to form a tilting pad support for said fluid foil member.

20. The compliant foil fluid film thrust bearing of claim 18 wherein said spring foil members include means to provide single narrow pivot supports and single flexure and tilting supports for said fluid foil member, pairs of pivot supports and pairs of flexure and titling supports, and trios of narrow pivot supports, said single narrow pivot supports, single flexure and tilting supports, pairs of pivot supports, pairs of flexure and titling supports, and trios of narrow pivot supports sequentially arranged together to form a tilting pad support for said fluid foil member.

21. The compliant foil fluid film thrust bearing of claim 18 wherein said spring foil members include:

a plurality of first narrow pivot supports;

a plurality of first wide flexure and tilting support pads having a trailing edge and a leading edge, with a first narrow pivot support pivotably supporting a first wide support pad intermediate the trailing edge and the leading edge of said first wide flexure and tilting support pad;

a plurality of pairs of second narrow pivot supports, with the trailing of a pair of second narrow pivot supports disposed on the trailing edge of a first wide flexure and tilting support pad and the leading of said pair of second narrow pivot supports disposed on the leading edge of a first wide flexure and tilting support pad;

a plurality of pairs of second wide flexure and tilting support pads each having a trailing edge and a leading edge, with the trailing of a pair of second narrow pivot supports pivotably supporting the trailing of a pair of second wide flexure and tilting support pads intermediate the trailing edge and the leading edge of said second wide flexure and tilting support pad and the leading of said pair of second narrow pivot supports pivotably supporting the leading of said pair of second wide flexure and tilting support pads intermediate the trailing edge and the leading edge of said second wide flexure and tilting support pad; and a plurality of trios of third narrow pivot supports, with one of a trio of third narrow pivot supports disposed on the trailing edge of the trailing of said pair of second wide flexure and tilting support pads, one of said trio of third narrow pivot supports disposed on the leading edge of by trailing of said pair of second wide flexure and tilting support pads, and one of said trio of third narrow pivot supports disposed on the trailing edge of the leading of said pair of second wide flexure and tilting support pads, each of said generally scoop shaped chevrons supported by a trio of third narrow pivot supports and the leading edge of the leading of said pair of second wide flexure and tilting support pads.

22. The compliant foil fluid film thrust bearing of claim 21 wherein said first narrow pivot support pivotably supports said first wide flexure and tilting support pad closer to the trailing edge of said first wide flexure and tilting support pad than to the leading edge of said first wide flexure and tilting support pad, the trailing of a pair of second narrow pivot supports pivotably supports the trailing of a pair of second wide flexure and tilting support pads closer to trailing edge of said second wide flexure and tilting support pad than to the leading edge of said second wide flexure and tilting support pad, and the leading of said pair of second narrow pivot supports pivotably supports the leading of said pair of second wide flexure and tilting support pads closer to trailing edge of said second wide flexure and tilting support pad than to the leading edge of said second wide flexure and tilting support pad.

23. The compliant foil fluid film thrust bearing of claim 21 wherein said first narrow pivot support pivotably supports said first wide flexure and tilting support pad closer to the trailing edge of said first wide flexure and tilting support pad than to the leading edge of said first wide flexure and tilting support pad, the trailing of a pair of second narrow pivot supports pivotably supports the trailing of a pair of second wide flexure and tilting support pads closer to trailing edge of said second wide flexure and tilting support pad than to the center said second wide flexure and tilting support pad, and the leading of said pair of second narrow pivot supports pivotably supports the leading of said pair of second wide flexure and tilting support pads closer to trailing edge of said second wide flexure and tilting support pad than to the center of said second wide flexure and tilting support pad.

24. The compliant foil fluid film thrust bearing of claim 15 wherein said converging wedge channels are generally annular segments having a radial leading edge and a radial trailing edge.

25. The compliant foil fluid film thrust bearing of claim 24 wherein said spring foil members include means to provide single narrow pivot supports and single flexure and tilting supports for said fluid foil member, pairs of pivot supports and pairs of flexure and titling supports, and trios of narrow pivot supports, said single narrow pivot supports, single flexure and tilting supports, pairs of pivot supports, pairs of flexure and titling supports, and trios of narrow pivot supports sequentially arranged together to form a tilting pad support for said fluid foil member.

26. The compliant foil fluid film thrust bearing of claim 24 wherein said spring foil members include:

a plurality of first narrow pivot supports;

a plurality of first wide flexure and tilting support pads having a trailing edge and *a* leading edge, with a first narrow pivot support pivotably supporting a first wide support pad intermediate the trailing edge and the leading edge of said first wide flexure and tilting support pad;

a plurality of pairs of second narrow pivot supports, with the trailing of a pair of second narrow pivot supports disposed on the trailing edge of a first wide flexure and tilting support pad and the leading of said pair of second narrow pivot supports disposed on the leading edge of a first wide flexure and tilting support pad;

a plurality of pairs of second wide flexure and tilting support pads each having a trailing edge and a leading edge, with the trailing of a pair of second narrow pivot supports pivotably supporting the trailing of a pair of second wide flexure and tilting support pads intermediate the trailing edge and the leading edge of said second wide flexure and tilting support pad and the leading of said pair of second narrow pivot supports pivotably supporting the leading of said pair of second wide flexure and tilting support pads intermediate the trailing edge and the leading edge of said second wide flexure and tilting support pad; and a plurality of trios of third narrow pivot supports, with one of a trio of third narrow pivot supports disposed on the trailing edge of the trailing of said pair of second wide flexure and tilting support pads, one of said trio of third narrow pivot supports disposed on the leading edge of the trailing of said pair of second wide flexure and tilting support pads, and one of said trio of third narrow pivot supports disposed on the trailing edge of the leading of said pair of second wide flexure and tilting support pads, each of said radially sided annular segments supported by a trio of third narrow pivot supports and the leading edge of the leading of said pair of second wide flexure and tilting support pads.

27. The compliant foil fluid film thrust bearing of claim 26 wherein said first narrow pivot support pivotably supports said first wide flexure and tilting support pad closer to the trailing edge of said first wide flexure and tilting support pad than to the leading edge of said first wide flexure and tilting support pad, the trailing of a pair of second narrow pivot supports pivotably supports the trailing of a pair of second wide flexure and tilting support pads closer to trailing edge of said second wide flexure and tilting support pad than to the leading edge of said second wide flexure and tilting support pad, and the leading of said pair of second narrow pivot supports pivotably supports the leading of said pair of second wide flexure and tilting support pads closer to trailing edge of said second wide flexure and tilting support pad than to the leading edge of said second wide flexure and tilting support pad.

28. The compliant foil fluid film thrust bearing of claim 26 wherein said first narrow pivot support pivotably supports said first wide flexure and tilting support pad closer to the trailing edge of said first wide flexure and tilting support pad than to the leading edge of said first wide flexure and tilting support pad, the trailing of a pair of second narrow pivot supports pivotably supports the trailing of a pair of second wide flexure and tilting support pads closer to trailing edge of said second wide flexure and tilting support pad than to the center said center wide flexure and tilting support pad, and the leading of said pair of second narrow pivot supports pivotably supports the leading of said pair of second wide flexure and tilting support pads closer to trailing edge of said second wide flexure and tilting support pad than to the center of said second wide flexure and tilting support pad.

29. The compliant foil fluid film thrust bearing of claim 24 wherein said spring foil members includes a plurality of narrow width spring foil elements and at least one wide spring pad element with said wide spring elements disposed between adjacent narrow width spring foil elements to form a tilting pad support for said fluid foil member.

*30. A compliant foil thrust bearing comprising:*

*an aerofoil disk having a plurality of fluid foils; and*

*a spring assembly providing flex and tilt support to the plurality of fluid foils comprising at least one independent flex and tilt support.*

*31. The thrust bearing of claim 30 wherein the aerofoil disk further comprises:*

*a shim ring having an inner diameter;*

*a plurality of fluid foils formed on an annular ring concentric with the shim ring and having a smaller diameter than the shim ring inner diameter;*

*a plurality of web elements, each web element connecting the shim ring and the plurality of fluid foils.*

*32. The thrust bearing of claim 30 wherein the spring assembly further comprises:*

*means for supporting each of the plurality of fluid foils;*

*first means for providing flex and tilt support for the means for supporting each of the plurality of fluid foils;*

*first means for providing pivotal support for the first means for providing flex and tilt support;*

*second means for providing flex and tilt support for the first means for providing pivotal support; and*

*second means for providing pivotal support for the second means for providing flex and tilt support.*

*33. The thrust bearing of claim 30 wherein the spring assembly further comprises:*

*a plurality of spring foils disks.*

*34. The thrust bearing of claim 33 wherein each of the plurality of spring foil disks further comprises:*

*a shim ring having an inner diameter;*

*a plurality of support elements formed concentric with the shim ring and within the shim ring inner diameter;*

*a plurality of web elements, each web element connecting the shim ring and one of the plurality of support elements.*

*35. The thrust bearing of claim 30 wherein the spring assembly further comprises:*

*a plurality of foil supports;*

*a plurality of first flex and tilt supports, each first flex and tilt support supporting one or two of the plurality of foil supports;*

*a plurality of first pivot supports, each first pivot support supporting one of the plurality of first flex and tilt supports;*

*a plurality of second flex and tilt supports, each second flex and tilt support supporting two of the plurality of first pivot supports; and*

*a plurality of second pivot supports, each second pivot support supporting one of the plurality of second flex and tilt supports.*

*36. The thrust bearing of claim 35 wherein:*

*the plurality of foil supports are generally radial;*

*the plurality of first pivot supports are generally radial; and*

*the plurality of second pivot supports are generally radial.*

*37. The thrust bearing of claim 30 wherein said bearing is hydrodynamic.*

*38. The thrust bearing of claim 30 wherein said bearing is hydrostatic.*

*39. A compliant foil thrust bearing comprising:*

*a fluid foil member having a plurality of fluid foils;*

*a spring assembly providing flex and tilt support to the plurality of fluid foils comprising at least one independent flex and tilt support.*

*40. The thrust bearding of claim 39 wherein the fluid foil member further comprises:*

*a shim ring having an inner diameter;*

*a plurality of fluid foils formed on an annular ring concentric with the shim ring and having a smaller diameter than the shim ring inner diameter;*

*a plurality of web elements, each web element connecting the shim ring and the plurality of fluid foils.*

*41. The thrust bearing of claim 39 wherein the spring assembly further comprises:*

*means for supporting each of the plurality of fluid foils;*

*first means for providing flex and tilt support for the means for supporting each of the plurality of fluid foils;*

*first means for providing pivotal support for the first means for providing flex and tilt support;*

*second means for providing flex and tilt support for the first means for providing pivotal support; and*

*second means for providing pivotal support for the second means for providing flex and tilt support.*

*42. The thrust bearding of claim 39 wherein the spring assembly further comprises:*

*a plurality of spring foil disks.*

*43. The thrust bearding of claim 42 wherein each of the plurality of spring foil disks further comprises:*

*a shim ring having an inner diameter;*

*a plurality of support elements formed concentric with the shim ring and within the shim ring inner diameter;*

*a plurality of web elements, each web element connecting the shim ring and one of the plurality of support elements.*

*44. The thrust bearing of claim 39 wherein the spring assembly further comprises:*

*a plurality of foil supports;*

*a plurality of first flex and tilt supports, each first flex and tilt support supporting one or two of the plurality of foil supports;*

*a plurality of first pivot supports, each first pivot support supporting one of the plurality of first flex and tilt supports;*

*a plurality of second flex and tilt supports, each second flex and tilt support supporting two of the plurality of first pivot supports; and*

*a plurality of second pivot supports, each second pivot support supporting one of the plurality of second flex and tilt supports.*

*45. The thrust bearing of claim 44 wherein:*

*the plurality of foil supports are generally radial;*

*the plurality of first pivot supports are generally radial; and*

*the plurality of second pivot supports are generally radial.*

*46. The thrust bearing of claim 39 wherein said bearing is hydrodynamic.*

*47. The thrust bearing of claim 39 where said bearing is hydrostatic.*

* * * * *

UNITED STATES PATENT AND TRADEMARK OFFICE

CERTIFICATE OF CORRECTION

PATENT NO. : RE 38,373 E
DATED : December 30, 2003
INVENTOR(S) : Robert W. Bosley It is certified that error appears in the above-identified patent and that said Letters Patent is hereby corrected as shown below:

Title page,
Item [57], ABSTRACT,
Line 3, please insert a period after “surface”.

Column 14,
Line 7, please replace “fluid film” with -- fluid foil --.

Column 15,
Line 27, please replace “fluid film member” with -- fluid foil member --.
Lines 61 and 64, please replace “titling” with -- tilting --.

Column 17,
Lines 2 and 5, please replace “titling” with -- tilting --.
Line 41, please replace “by” with -- the --.

Column 18,
Lines 22 and 25, please replace “titling” with -- tilting --.

Column 19,
Line 29, please replace “center said center wide” with -- center of said second wide --.

Column 20,
Line 3, please replace “foils” with -- foil --.
Lines 45 and 65, please replace “bearding” with -- bearing --.

Column 21,
Line 1, please replace “bearding” with -- bearing --.

Signed and Sealed this

Nineteenth Day of October, 2004

JON W. DUDAS
*Director of the United States Patent and Trademark Office*